W. CLEMENT.

VALVE FOR PERCUSSIVE TOOLS.

APPLICATION FILED JUNE 19, 1915.

Reissued Aug. 10, 1915.

13,959.

INVENTOR

William Clement

BY

Ralph Brown & Brooks

ATTORNEY

UNITED STATES PATENT OFFICE.

WILLIAM CLEMENT, OF PHILLIPSBURG, NEW JERSEY, ASSIGNOR TO INGERSOLL-RAND COMPANY, OF NEW YORK, N. Y., A CORPORATION OF NEW JERSEY.

VALVE FOR PERCUSSIVE TOOLS.

13,959. Specification of Reissued Letters Patent. Reissued Aug. 10, 1915.

Original No. 1,078,188, dated November 11, 1913, Serial No. 700,621. Application for reissue filed June 19, 1915. Serial No. 35,182.

*To all whom it may concern:*

Be it known that I, WILLIAM CLEMENT, a citizen of the United States, residing in Phillipsburg, in the county of Warren and State of New Jersey, have invented certain new and useful Improvements in Valves for Percussive Tools, of which the following is a specification.

This invention relates to valves for percussive tools and more particularly to valves for that type of tool which is provided with inlet passages at the extreme ends of the cylinder and exhaust passages from points in the cylinder at a distance from the ends of the tool, the valve being thrown by compression produced by the movement of the piston, after it has overrun the exhaust ports, which is exerted against the surfaces of the valve through the inlet passages. In these valves as heretofore constructed the pressure tending to hold the valve in thrown position has been considerably greater than the opposed pressure and it has been necessary in order to overcome this excess to obtain considerable compression in the ends of the cylinder to throw the valve.

The object of the present invention is to produce a valve of this type wherein opposing pressures will be practically balanced before the piston overruns the exhaust ports so that a very slight degree of compression will throw the valve, rendering its action quicker and more positive. With this object in view I have devised a valve a practical embodiment of which is shown in the accompanying drawings in which—

Figure 1:
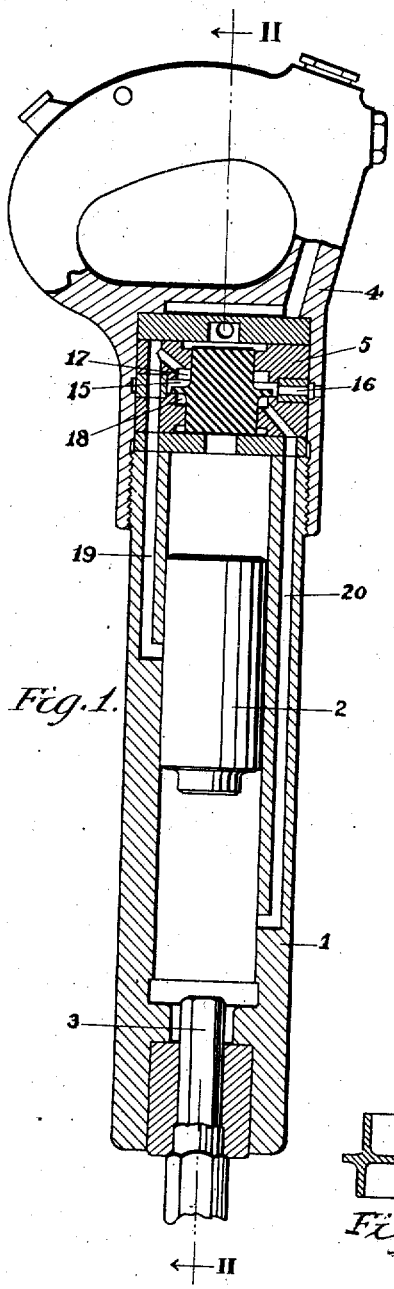
Figure 2:
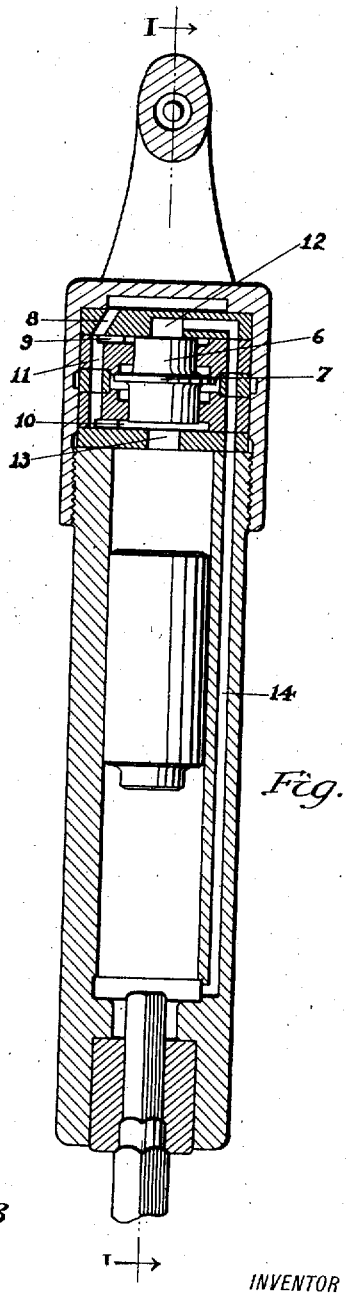

Figure 1 is a longitudinal section of the tool taken on the line I—I of Fig. 2. Fig. 2 is a similar section at right angles to Fig. 1, taken on the line II—II of Fig. 1 and Fig. 3 is a sectional view of a modified form of the valve spool.

The tool as shown comprises a cylinder 1 in which reciprocates a piston 2 which actuates by its impact the chipping chisel or other tool-piece 3. To the other end of the tool is secured the handle 4 which is threaded on the back end of the cylinder and holds securely in place the valve chest 5. Located in the valve chest and movable lengthwise of its axis is the valve which consists of a cylindrical body 6, which may or may not be of the same diameter throughout its length, from which projects a flange 7. From the inlet of the tool a passage 8 leads to what may be termed the inlet chamber, or space, in the valve chest, which comprises chambers 9 and 10, at the ends of the valve, joined by a passage 11. In the opposite faces of chambers 9 and 10 are inlet ports 12 and 13, port 12 communicating with the extreme front end of the cylinder through passage 14, and port 13 leading directly into the back end of the cylinder. These ports are so constructed as to be opened and closed alternately to the chambers 9 and 10 by the ends of the valve body 6. Between the chambers 9 and 10 and surrounding the valve body is the exhaust chamber 15 which communicates with the atmosphere through the passage 16. In the opposite faces of the valve chamber 15 are annular exhaust ports 17 and 18 which are so placed as to be alternately closed by the opposite faces of the flange 7. From port 17 the passage 19 leads to the interior of the cylinder opening into it at a point some distance from the back end. From port 18 the passage 20 leads to the cylinder opening into it at a point a short distance from the front end of the cylinder. The area of the ports 17 and 18 is an important feature of the present design. When port 17 is closed by the flange 7 the area of the flange 7 which is exposed to the forward pressure of the fluid in port 17, must be approximately equal to the area of the front end of the valve body 6 which is exposed at the same time to the fluid pressure in the inlet chamber 10. In the same way the area of the forward face of the flange 7 exposed to the rearward fluid pressure in the port 18 must be approximately equal to the area of the rear end face of the valve body 6, which when the port 18 is closed is exposed to a forward fluid pressure in the chamber 9.

In practice the areas of the valve end faces are in each case a few per cent. larger than the opposing pressure areas on the flange faces, in order to prevent fluttering, but the essential idea of the present invention is that these opposed surfaces shall be of approximately equal area.

Figure 3:
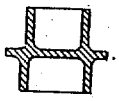

In Fig. 3 is shown a modification of the valve spool, the distinction between this and the form shown in Figs. 1 and 2 being merely that the spool is hollowed out to make it as light as possible. In this modification the "faces" of the valve body are made up of the edges of the hollow valve cylinder together with the surfaces of the inner end of the bore in each end of the valve body, the operation of this valve being the same in practice and theory as the solid spool.

In operation, supposing the parts to be in the position shown in Fig. 2, fluid under pressure will be introduced into the back end of the cylinder through the passages 8 and 11, chamber 10 and port 13, and will drive the piston forward. When the piston is in the position shown in the figure the forward end face of the valve body 6 will be exposed to live fluid pressure tending to hold it in rearward position. There will also be a pressure exerted in the same direction on account of the fluid from the front of the cylinder exhausting through the passage 20 and streaming against the front face of the flange 7 as it passes through exhaust passage 16. As soon however as the piston uncovers the opening of the exhaust passage 19 live fluid pressure will be exerted from the cylinder through passage 19 on the back surface of the valve flange exposed to the port 17 which is closed at that time by flange 7. As the area of this port and consequently the area of the flange exposed thereto is approximately equal to the area of the forward end of the valve body the live fluid pressure on the valve will be practically balanced in both directions. As soon as the piston covers the end of the passage 20 the valve will be practically in equilibrium as there will be no further air escaping from the front end of the cylinder through passage 20 and pressing backwardly on the front face of the valve flange. It is evident therefore that the piston will have to overrun the passage 20 a very slight distance in order to produce sufficient compression in the front end of the cylinder to overbalance the valve and throw it forward, closing port 13 and admitting fluid to the front end of the cylinder through the port 12 and passage 14 to carry the piston in the other direction. In the same way, as the area of the flange 7 exposed to port 18 is approximately equal to the rear end face of the valve body, the live fluid pressures on the valve will be again balanced as soon as the piston clears the end of the passage 20 on its backward stroke, enabling the valve to be thrown rearwardly very shortly after the piston covers passage 19. It is evident that by throwing the valve more quickly in this way, a quicker and more powerful stroke of the piston will be secured.

Although in the tool, as shown, the inlet ports for the cylinder are controlled by the ends of the valve body and the exhaust ports by the flange, it is evident that the position of these ports might be reversed and the exhaust ports controlled by the ends of the valve body and the inlet ports controlled by the flange, without any invention being involved.

It is to be understood that the present showing and description discloses only certain specified modifications of my invention and other forms and modifications are included in the spirit and scope of the invention as expressed in the claims.

What I claim is:

1. In a percussive tool, a cylinder, its piston, a valve chest having a bore for the valve body and a chamber therearound for the valve flange, ports in the ends of the bore leading to the ends of the cylinder, ports in the faces of the flange chamber leading to points at a distance from the ends of the cylinder, inlet chambers opening into said valve bore, said ports leading to the cylinder ends being arranged to be alternately opened and closed to said inlet chambers by the ends of the valve body and said flange chamber ports to be alternately opened and closed by said flange, the area of each of said flange chamber ports being approximately equivalent to the area of the opposed valve body end, and an exhaust passage leading from said flange chamber.

2. In a percussive tool, a cylinder, a piston, a valve chest having a bore and a chamber therearound, a valve having a body fitting said bore and reciprocating therein and a flange reciprocating in said chamber, exhaust passages from the cylinder controlled by said flange, and inlet passages controlled by the ends of said valve body, said inlet passages also serving to convey compression from the cylinder to throw the valve.

3. In a percussive tool, a cylinder, a valve chest having a bore and a chamber therearound, a valve having a body fitting said bore and reciprocating therein and a flange reciprocating in said chamber, exhaust passages from the cylinder controlled by said flange, and inlet passages controlled by the ends of said valve body.

4. In a fluid operated percussive drill, a cylinder, its piston, a valve bore, a valve in said bore having a cylindrical body and a flange thereon, a fluid space comprising chambers surrounding the said valve bore, ports in the ends of said bore adapted to be alternately opened and closed to said chambers by the ends of said valve, annular ports surrounding said valve bore on each side of said flange and opening into a second fluid space comprising a central chamber of larger cross section, the said ports being adapted to be alternately opened and closed by the said flange, passages leading from each of said ports to the cylinder, and means for connecting one of said fluid spaces with air pressure and the other with the atmosphere.

5. In a fluid operated percussive drill, a cylinder, its piston, a valve bore, a valve in said bore having a cylindrical body and a flange thereon, a fluid space comprising chambers surrounding the said valve bore, ports in the ends of said bore adapted to be alternately opened and closed to said chambers by the ends of said valve, annular ports surrounding said valve bore on each side of said flange and opening into a second fluid space comprising a central chamber of larger cross section the said ports being adapted to be alternately opened and closed by the said flange and each being substantially equal in area to the area of the opposed valve body end, passages leading from each of said ports to the cylinder, and means for connecting one of said fluid spaces with air pressure and the other with the atmosphere.

6. In a fluid operated percussive tool, a cylinder, its piston, a valve bore, a valve in said bore having a cylindrical body and a flange thereon, inlet chambers opening into said valve bore, means to supply fluid under pressure to said inlet chambers, ports in the end of said bore adapted to be alternately opened and closed to said inlet chambers, by the ends of said valve body, passages leading from said ports to opposite ends of said cylinder, annular exhaust ports surrounding said bore on each side of said flange and opening into a central exhaust chamber of larger diameter, the said ports adapted to be alternately opened and closed by said flange, and exhaust passages leading to said exhaust ports from points at some distance from opposite ends of the cylinder.

7. In a fluid operated percussive tool, a cylinder, its piston, a valve bore, a valve in said bore having a cylindrical body and a flange thereon, inlet chambers opening into said valve bore, means to supply fluid under pressure to said inlet chambers, ports in the end of said bore adapted to be alternately opened and closed to said inlet chambers by the ends of said valve body, passages leading from said ports to opposite ends of said cylinder, annular exhaust ports surrounding said bore on each side of said flange and opening into a central exhaust chamber of larger diameter, the said ports adapted to be alternately opened and closed by said flange and each being of an area substantially equal to the opposed end face of the valve body, and exhaust passages leading to said exhaust ports from points at some distance from opposite ends of the cylinder.

WILLIAM CLEMENT.